United States Patent
Zhou et al.

(10) Patent No.: US 8,023,218 B2
(45) Date of Patent: Sep. 20, 2011

(54) ELECTRIC FIELD ASSISTED MAGNETIC RECORDING

(75) Inventors: Yuchen Zhou, San Jose, CA (US);
Kowang Liu, Fremont, CA (US);
Kunliang Zhang, Fremont, CA (US);
Erhard Schreck, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 352 days.

(21) Appl. No.: 12/313,796

(22) Filed: Nov. 25, 2008

(65) Prior Publication Data
US 2010/0128377 A1 May 27, 2010

(51) Int. Cl.
*G11B 5/02* (2006.01)
(52) U.S. Cl. .......................... 360/59; 360/75
(58) Field of Classification Search .................. None
See application file for complete search history.

(56) References Cited

U.S. PATENT DOCUMENTS

| | | | |
|---|---|---|---|
| 5,239,504 | A | 8/1993 | Brady et al. |
| 6,667,118 | B1 | 12/2003 | Chang et al. |
| 6,809,516 | B1 | 10/2004 | Li et al. |
| 7,166,376 | B2 | 1/2007 | Hikosaka et al. |
| 7,282,755 | B2 * | 10/2007 | Pakala et al. ............ 257/295 |
| 7,706,103 | B2 * | 4/2010 | Seigler ............... 360/125.17 |
| 2006/0222904 | A1 | 10/2006 | Hsia et al. |
| 2007/0297081 | A1 * | 12/2007 | Nazarov et al. ............. 360/59 |
| 2009/0059424 | A1 * | 3/2009 | Kim et al. ............. 360/123.01 |
| 2010/0079039 | A1 * | 4/2010 | Lampenscherf et al. ..... 310/367 |

OTHER PUBLICATIONS

"Large Electrostrictive Actuation of Barium Titanate Single Crystals," by E. Burcsu et al., Journal of the Mechanics and Physics of Solids, Aug. 12, 2003, pp. 1-25.

"Nanodomain manipulation for ultrahigh density ferroelectric data storage," by Cho et al., Institute of Physics Publishing, Nanotechnology 17 (2006) S137-S141.

"Magnetization reversal process and magnetic relaxation of self-assembled Fe3Pt nanowire arrays wtih different diameters: Experiment and micromagnetic simulations," by Gao et al., Physical Review b 75, 064421 (2007), pp. 1-6.

Modem Magnetic Materials: Principles and Applications, by O'Handley, Massachusetts Institute of Technology, copyright 2000, John Wiley & Sons, Inc., NY, pp. 238-239.

"Magnetization and magnetostriction processes in Tb(0.27-0.30)Dy(0.73-0.70)Fe(1.9-20.3)," by Armstrong, Journal of Applied Physics 81 (5), Mar. 1, 1997, pp. 2321-2326.

"Ferroelectric thin films: Review of materials, properties, and applications," by Setter et al., Journal of Applied Physics 100, 051606 (2066), pp. 1-46.

* cited by examiner

*Primary Examiner* — Jason Olson
(74) *Attorney, Agent, or Firm* — Saile Ackerman LLC; Stephen B. Ackerman (57) ABSTRACT

We describe a system for electric field assisted magnetic recording where a recordable magnetic medium includes a magnetic recording layer of high coercivity and vertical magnetic anisotropy that is adjacent to an electrostrictive layer which can be placed in a state of stress by a electric field or which is already pre-stressed and which pre-stress can be turned into strain by an electric field. When the magnetic medium is acted on simultaneously by a magnetic writing field and an electric field, the stress in the electrostrictive layer is transferred to a magnetostrictive layer which is the magnetic recording layer by itself or is coupled to the magnetic recording layer, whereupon the magnetic recording layer is made more isotropic and more easily written upon. Residual stresses in the electrostrictive layer can then be removed by an additional electric field of opposite sign to the stress-producing field.

11 Claims, 4 Drawing Sheets

| IL Material | Von Mises Stress @ RL [GPa] | Coupling Efficiency | Induced In-plane Strain @ RL [1e-6] | Induced Vertical Strain @ RL [1e-6] |
|---|---|---|---|---|
| Ru | 0.27 | 19% | 160 | 25 |
| Mat 1 | 0.255 | 18% | 154 | 23.8 |
| Mat 2 | 0.02 | <2% | 24 | 36 |

FIG. 5

| Layer 7-9-8 Thickness | Induced Von Mises Stress @ RL [GPa] | Coupling Efficiency | Induced In-plane Strain @ RL [1e-6] | Induced Vertical Strain @ RL [1e-6] |
|---|---|---|---|---|
| Nominal (50-10-20) | 0.27 | 19% | 160 | 25 |
| 50-5-20 (Thin Layer 9) | 0.3 | 21% | 188 | 37 |
| 500-10-20 (Thicker Layer 7) | 1.11/1.95 (Layer 9 stress) | 57% | 1287 | 617 |
| 500-10-20 (Thicker Layer 7 + thinner Layer 8) | 1.19/1.95 | 61% | 1217 | 616 |

ELECTRIC FIELD ASSISTED MAGNETIC RECORDING

BACKGROUND OF THE INVENTION

1. Field of the Invention

This invention relates generally to magnetic writing on a magnetic medium where a magnetic layer to be written upon is stressed by the electrostriction of an adjacent electrostrictive layer and the electric field producing the electrostriction and the magnetic field producing the writing are both simultaneously generated by a recording head.

2. Description of the Related Art

Magnetic recording at area data densities of between 1 and 10 Tera-bits/in$^2$ (Tbpsi) involves the development of new magnetic recording mediums, new magnetic recording heads and, most importantly, a new magnetic recording scheme that can delay the onset of the so-called "superparamagnetic" effect by the use of magnetic recording mediums with high magnetic anisotropy that can still be written upon by the increasingly small write heads required for producing the high data density. The problem has two conflicting requirements: 1. the need for a stronger writing field that is necessitated by highly anisotropic magnetic mediums and; 2. the need for a smaller write head to produce the high a real write densities, which write heads, disadvantageously, produce a smaller field gradient and broader field profile. Satisfying these requirements may be a limiting factor in the further development of the present magnetic recording scheme used in state of the art hard-disk-drives (HDD). If that is the case, further increases in recording area density may not be achievable within those schemes.

The prior art "assisted-recording" schemes being applied to the mitigation of the above problem share a common feature, which is to pump energy into the magnetic system through the use of physical methods that are not directly related to the magnetic field produced by the write head. If such an assisted recording scheme can produce a medium property profile to enable low-field writing localized at the write field area, high data density recording can be achieved by even a weak write field as a result of the multiplicative effect of the spatial gradients of both the medium property profile and the write field. However, these prior art methods either involve deep sub-micron localized heating by an optical beam or ultra-high frequency AC magnetic field generation, both of which are expensive, complicated and inefficient to produce.

Figure 1:
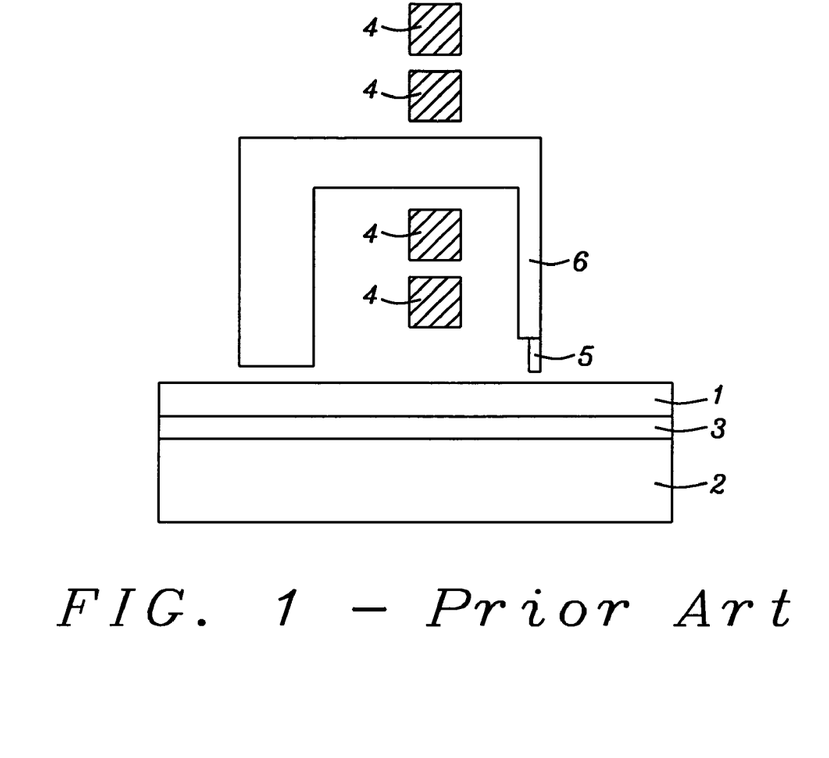
FIG. 1 is a schematic illustration of a magnetic write head and magnetic recording medium of the prior art.

Referring to FIG. 1 there is shown a schematic, vertical-plane cross-sectional illustration of a prior art perpendicular recording system. The perpendicular recording medium (10) includes a magnetic recording layer, (1), a magnetically soft underlayer (SUL) (2) and an interlayer (3). The magnetic recording (write) head (20) comprises a write coil (4), a pole-tip (5) and a yoke/return pole (6). During the recording process, the write coil (4) is energized by an electrical current that induces a magnetic field whose flux lines are concentrated by the yoke/pole structure. The pole tip (5) concentrates these flux lines still further, producing a locally high density of flux lines in the recording layer (1) beneath the pole tip. The SUL (2) acts as a magnetic imaging layer for the writer, which both enhances the magnetic field produced in the recording layer at the pole tip and also provides a return path for the magnetic flux to the rear portion of the yoke/return pole producing a closure of the flux lines. An inherent problem in the recording scheme as exemplified by this figure is that as the size of the pole tip (5) decreases to increase the recording density, the magnetic field produced in the recording layer at the pole tip position decreases in amplitude, which causes a loss of writability and increases in lateral spread, which causes interference with neighboring bits and, thereby, decreases achievable data density.

For thermal-assisted magnetic recording, also known as heat-assisted magnetic recording (HAMR), an optical laser beam is directed onto the write head. By passage through an optical waveguide and a near-field antenna, the optical energy is focused into a deep sub-micron size optical spot on the recording layer (1) close to the pole-tip (5), where the write field profile of the pole-tip overlaps with the optical spot. The optical energy delivered to the recording layer heats up the layer locally. The temperature rise produces a decrease in the magnetic anisotropy of the recording layer material and the magnetization of the recording layer grains becomes more easily switched by the write field. With the optically created medium anisotropy profile overlapping with the writer field profile, the effective write field spatial gradient can be significantly enhanced due to the multiplicative effect of the thermal and magnetic field gradients. Thus, recording can be achieved with the lower magnetic write field of the smaller write head with a resulting higher recording density.

For ferromagnetic-resonance-assisted magnetic recording, also known as microwave-assisted magnetic recording (MAMR), an AC magnetic field in the frequency of tens of Giga-Hz (GHz) is imposed upon the location of the recording medium where the write head reverses the magnetizations of the magnetic recording layer (1). When the frequency is close to the ferromagnetic resonance (FMR) frequency of the magnetization of the magnetic grains in the recording layer (1), energy can be pumped into the magnetic medium grain magnetizations to bring them into an FMR mode, which leads to their switching by a much lower write head field than would otherwise be required. With the medium FMR having a high quality factor, i.e., at a given AC field frequency, the highest FMR occurs at a given reversing field and decreases quickly as the field deviates from that value (sharply peaked frequency dependence of FMR), the write field gradient can also be effectively enhanced and higher write densities can be achieved at lower fields.

The binary-anisotropy-assisted magnetic recording (BAMR) is similar to HAMR. In this scheme an antiferromagnetic-ferromagnetic (AFM-FM) transitional layer is formed beneath the uppermost perpendicular-to-plane high-anisotropy recording layer and another, lower, high anisotropy layer having in-plane anisotropy is formed beneath the transitional layer. Upon local heating, the AFM-FM switches from its AFM phase to its FM phase and exchange couples the upper high anisotropy recording layer to the lower high anisotropy layer. Thus the locally heated area acts similarly to a single magnetic domain with two high-anisotropy axes that are perpendicular to each other. The in-plane anisotropy of the lower layer makes the magnetization of the upper recording layer easier to switch. With the heating gradient profile effectively multiplying the write-field gradient, the effective write-field gradient is enhanced as it is in HAMR.

The existing assisted-recording schemes discussed briefly above have a common feature, the pumping of energy into the magnetic system by means other than directly increasing the magnetic write field of the write head. However, as already mentioned, these methods all are expensive, complicated and energetically inefficient. What is needed and what the present invention will provide, is an easy and effective transition from conventional perpendicular magnetic recording to an assisted form of magnetic recording in which the assistance methodology requires less complication of existing head-manufacturing processes and relies on a physical property of the recording system that is more easily controlled.

SUMMARY OF THE INVENTION

A first object of this invention is to provide magnetic recording with high density under circumstances where the recording medium has high magnetic anisotropy.

A second object of the present invention is to fulfill the first object by means of electric field assisted recording.

A third object of the present invention is to achieve the first and second objects by means of the action of an electric field on a recording medium that includes electrostrictive layers.

A fourth object of the present invention is to provide a recording medium that integrates magnetostrictive layers, magnetic recording layers and electrostrictive layers.

A fifth object of the present invention is to provide a carefully controllable recording mechanism where stresses produced in an electrostrictive medium produce corresponding stresses in a magnetostrictive recording medium, thereby lowering the strength of the write field that would be otherwise required.

The above objects will be met by a magnetic recording medium that is a multi-layered fabrication of magnetic recording layers, magnetostrictive layers, electrostrictive layers and intermediate coupling layers. To write on this recording medium a magnetic write head will be provided that has structures for creating both magnetic and electric fields. The basic concept is that by elastically coupling electrostrictive layers to magnetostrictive layers and separate or combined magnetic recording layers, stresses produced in the electrostrictive layers will be transferred to the magnetostrictive layers, and thereupon to the recording layers, where the stresses will act to reduce the magnetic anisotropy and allow the recording as though the write-fields of the write heads were enhanced. To understand the process, it will be useful to briefly summarize some properties of magnetostriction and electrostriction.

Magnetostriction and Electrostriction

Magnetostriction describes the physical expansion or contraction of a ferromagnetic material when it is magnetized by an externally applied magnetic field. The effect of physical change due to magnetization can be reversed, in that the application of stresses to a ferromagnetic material that produce a concurrent strain (change in the ratio of elongation or contraction), will cause the material to acquire an anisotropy due to the alignment of magnetization in directions of the applied stress.

Prior art such as C.-H. Chang and R. Y. Ranjan, U.S. Pat. No. 6,667,118 B1, suggests that this property can be enhanced by the use of textured substrates on which to deposit thin magnetic films. The effects on the topography of the deposited thin film by the underlying texture can affect the stress and strain in the film, leading to directional anisotropy that improves performance.

Other prior art, T. Hikosaka et al., U.S. Pat. No. 7,166,376 B2, uses highly magnetostrictive material in combination with the recording material of the magnetic medium. During recording, the magnetic write field induces strain within the magnetostrictive layer. With the magnetostrictive layer being coupled to the recording layer, the strain results in induced magnetic anisotropy in the recording layer. Such induce anisotropy improves the switching field distribution of the recording medium and provides improved recording quality. It is claimed that magnetostriction can reach up to $\lambda=4\times10^{-4}$, i.e., to the 0.04% level.

Figure 2:
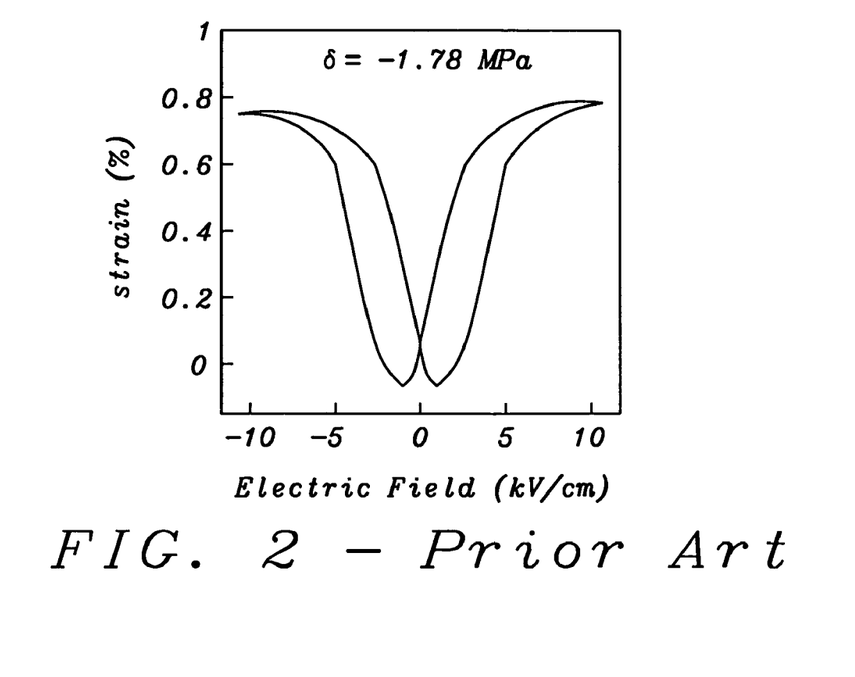
FIG. 2 is a graphical representation of the electrostriction of a Barium Titanate crystal.

Electrostriction, a similar property to magnetostriction, describes the physical expansion or contraction of a ferroelectric material subjected to an external electric field. The external electric field produces a polarization of the ferroelectric material. Comparatively, electrostriction can produce a much larger strain than magnetostriction, reaching as high as the 1% level. FIG. 2 shows the electrostriction of Barium Titanate ($BaTaO_3$) single crystal under a stress of 1.78 Mega Pascals as reported in the prior art, E. Burcsu et al., "Large Electrostrictive Actuation of Barium Titanate Single Crystals," J. Mech. Phys. Solids, vol. 52, pp 823 (2004). This shows that an electric field of as much as between approximately 10 kV/cm or 1 mV/nm can produce significant strain. In addition to this large strain, ferroelectric material has also been studied in other areas, for example ferroelectric-RAM and ferroelectric recording, where ferroelectric thin films shows excellent capability of localized polarization and response to electric fields in a domain size as small as 8 nm, as reported in Y. Cho et al., "Nanodomain manipulation for ultrahigh density ferroelectric data storage," Nanotechnology, vol. 17, pp S137 (2006). By combining the electrostriction of ferroelectric film and the magnetostriction of ferromagnetic film, electric field-assisted magnetic recording may be achieved with much finer resolution than heat and AC field assisted methods of the prior art.

DESCRIPTION OF THE INVENTION

This invention describes the use of electrostrictive material in combination with magnetostrictive material to enable the electric field assisted magnetic recording at high area density. To accomplish this process, an electric field is created by imposing a voltage difference between a recording head and a recording medium so that a deep sub-micron sized localized region of electric polarization is produced in a layer of electrostrictive material that is part of the recording medium. This polarized region in turn causes a strong localized strain in that layer. This localized strain is then coupled, through physical contact, with a magnetostrictive layer that is also a part of the recording medium. The coupling of this strain to the magnetostrictive layer thereupon produces a stress induced magnetic anisotropy in the magnetostrictive layer. The magnetostrictive layer can also be the recording (storage) layer, or it can itself be magnetically exchange coupled to an adjacent recording layer. Thus the induced magnetic anisotropy will locally decrease the magnetic field required to write on the recording layer of the magnetic medium, be it the magnetostrictive layer, a layer coupled to the magnetostrictive layer, or a composite layer having both electrostrictive and magnetostrictive properties. Thus, recording at what is effectively a lower coercivity magnetic layer is achieved. Additionally, by controlling the profile of the local electric field and its spatial gradient with respect to the write head's magnetic field profile and gradient, an effective recording field gradient can be improved in both a down-track and cross-track direction, to enable high density magnetic recording.

The electric field is, therefore, converting electric field energy into magnetic energy through the strain/stress coupling. Since electrostriction can be much larger than than magnetostriction, and since a structure for applying an electric field to a recording medium can be more easily incorporated within present write-head designs than other types of assist structures, this is a physically and economically viable approach.

Magnetostriction combined with electrostriction for data storage has been suggested in the prior art, M. Brady, U.S. Pat. No. 5,239,504, where the electrostrictive strain is not created by an electric field, but by heating and mechanical sound waves. Such methods cannot apply to magnetic recording in sub-100 nm resolutions and do not use localized magnetic fields to assist the recording.

For electric field assisted magnetic recording that meets the objects of the present invention, the electric field is to be created between the magnetic recording medium and the recording head by imposing a voltage difference between the recording head and the magnetic medium. The metallic based magnetic write-head itself, or a dedicated electric field generating structure can be used to generate the electric field. With clearance between the head and the medium surface being less than approximately 10 nm in today's HDDs, an electric field of sufficient strength can be produced by a moderate voltage difference (e.g., 1V/10 nm=1 MV/cm), which would be of sufficient strength to produce significant strain in the electrostrictive layer.

The electric field assisted magnetic recording is not limited to perpendicular or longitudinal recording. However, as an exemplary embodiment we will describe a scheme of perpendicular recording in the following.

DESCRIPTION OF THE PREFERRED EMBODIMENTS

The preferred embodiment of the present invention is a magnetic recording medium for use in electric field-assisted recording and an electric field-assisted magnetic recording system for recording on said magnetic recording medium.

The electric field-assisted method to be described below is not limited to perpendicular or longitudinal recording. However, as a preferred embodiment, we will describe a recording system that uses the perpendicular mode.

The Magnetic Medium

We begin by considering a horizontally layered magnetic medium, formed substantially of contiguous, coextensive layers, that includes at least one layer of magnetic recording material, at least one layer of magnetostrictive material and at least one layer of electrostrictive material. However, as we shall see, the layer of magnetostrictive material and the layer of recording material can be the same layer. Alternatively, the layer of magnetostrictive material and the layer of recording material can be a magnetically coupled bi-layer. For ease of description, we will assume at the outset that there is only one layer of electrostrictive material and only one layer of magnetic material that is both a magnetostrictive and a recording layer. We also note that we frame this description in terms of a perpendicular recording scheme, so the storage of magnetic data will be implemented as vertical orientations of magnetization within a layer of magnetic material. It is also possible to store magnetic data as longitudinal orientations of magnetization in the context of a longitudinal recording scheme, but such a scheme will not be described in the following.

The recording layer is a layer of high coercivity material with strong perpendicular magnetic anisotropy that we will refer to as its intrinsic anisotropy because it is formed during the deposition of the layer. In its non-recording, or storage, state, the recording layer holds information in the form of vertical orientations of magnetization in a thermally stable configuration. Under the magnetic field from the recording head alone, the magnetization will not switch due to the high coercivity of the recording material.

With the application (by the recording head) of an electric field overlapping the magnetic field, a strain is produced in the layer of electrostrictive material which, because it is coupled to the magnetostrictive/recording layer, produces a stress-induced magnetic anisotropy in that layer. Ideally, the stress induced magnetic anisotropy is preferably in the plane of the magnetostrictive/recording layer, which makes it easier to switch the perpendicular magnetization which is highly stable as a result of the intrinsic vertical anisotropy of the magnetic recording layer. In principle, if the stress-induced in-plane anisotropy is of the same level as the intrinsic perpendicular magnetic anisotropy, the effective anisotropy becomes more isotropic and the stored information becomes easier to switch with even a small applied magnetic field. When the switching is complete, the electric field is turned off and the original intrinsic perpendicular anisotropy of the recording layer remains to maintain the new magnetization in a stable, vertical configuration. With the additional gradient of the electric field and the stress-induced anisotropy, an effective recording field gradient is produced that is sharply defined and can produce magnetic transitions within a very small area. Due to the mechanical nature of stress, the magnetostrictive material reacts to stress-induced changes with the speed of sound in the material. With typical materials and with film dimensions of tens of nanometers, transition times (the time for a magnetization to change) are a few picoseconds, which is fast enough for the expected write frequencies.

Figure 3A:
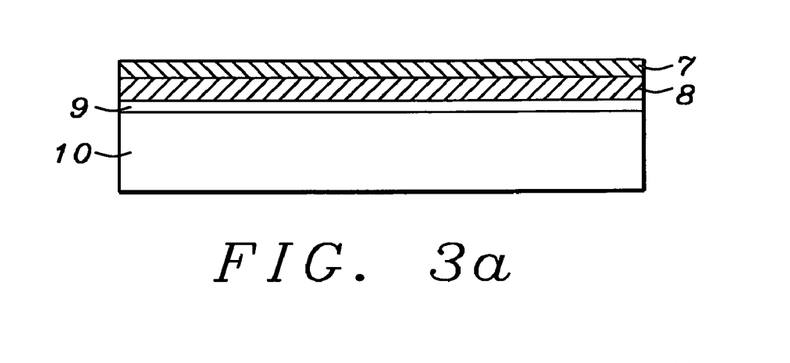
FIG. 3a and FIG. 3b are each schematic illustrations of an exemplary recording medium for a preferred embodiment of the present invention.
Figure 3B:
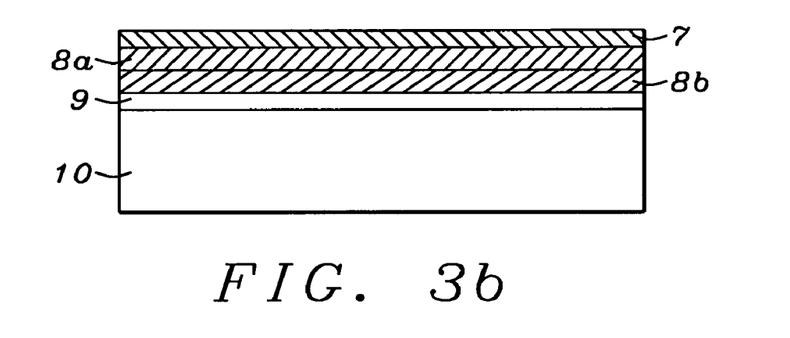

Referring now to FIGS. 3a and 3b there are shown two schematic illustrations of a vertical cross-section of a magnetic recording medium fulfilling a preferred embodiment of the present invention. The difference between FIG. 3a and FIG. 3b is that in FIG. 3a the the magnetic recording layer is a single layer (8), while in FIG. 3b it is a bi-layer (8a), (8b).

Referring to FIG. 3a and looking vertically downward from the upper surface of the medium that will be adjacent to the write head, there is seen first the electrostrictive layer (7) which is above the magnetic recording layer (8). With this structure, a voltage can be applied between the recording head field generating structure (see FIG. 7a and FIG. 7b) that would be positioned above layer (7) and the recording layer (8). Because the distance between the recording head and the layer (7) is so small, a strong electric field in layer (7) is easy to obtain. Layer (8) can be a magnetic recording layer with magnetostrictive properties and layer (7) couples directly to layer (8) through mechanical contact so that the stress induced in layer (7) is mechanically transferred to layer (8). When layer (8) is stressed, a stress-induced magnetic anisotropy is produced that then helps layer (8) to be written upon by the magnetic field of the write head. Referring to schematic FIG. 3b, it is seen that single layer (8) of FIG. 3a can also be a composite bi-layer, in which an upper portion (8a) that contacts layer (7) is magnetostrictive and a lower portion (8b) is a storage layer with high coercivity and magnetic anisotropy. Layer (8a) couples to layer (8b) by magnetic exchange coupling. Referring back to FIG. 3a, there is also shown layer (9), which is an interlayer that helps the growth of the structure of layer (8), for example by supporting the formation of smaller magnetic grains and inducing a perpendicular magnetic anisotropy in (8) when (8) is a perpendicular magnetic recording medium. Referring also to FIG. 3b, interlayer (9) plays the same role of enhancing the growth of small grains in layers (8b) and (8a). Substrate (10) in both FIG. 3a and FIG. 3b can be a supporting substrate for the growth of the overlaying layers or it can be a magnetically soft underlayer (SUL) to strengthen the magnetic field in the magnetic recording layer.

Figure 4A:
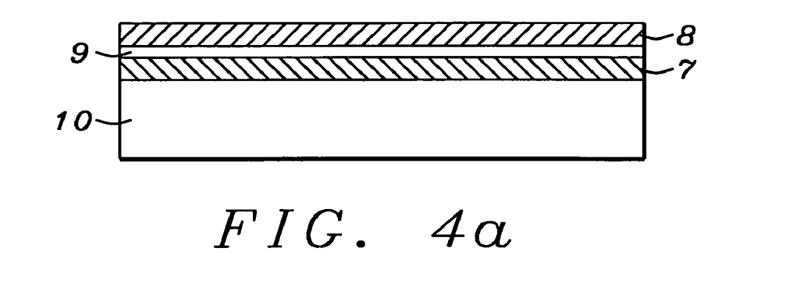
FIG. 4a and FIG. 4b are each schematic illustrations of an exemplary recording medium for a preferred embodiment of the present invention.
Figure 4B:
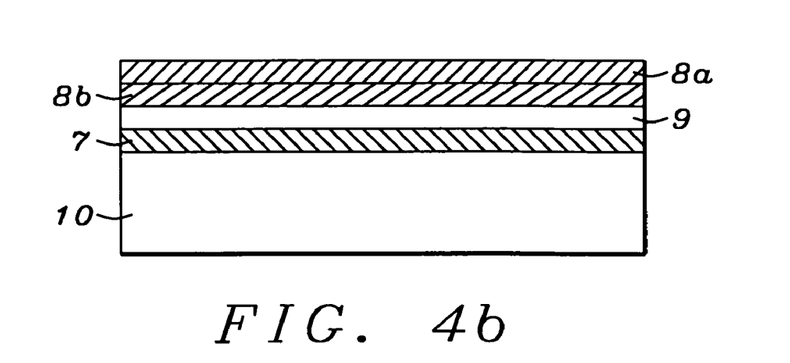

Referring now to schematic FIG. 4a and FIG. 4b, there are shown two additional preferred embodiments of the present invention in which the magnetic recording layer ((8) in FIG. 4a, (8a), (8b) in FIG. 4b) is formed over the electrostrictive layer (7). In this configuration (FIG. 4a) the growth promoting interlayer (9) can be between the electrostrictive layer and the magnetic layer or (FIG. 4b) the growth promoting layer (9) can be beneath both the magnetic layers (8a)(8b), and the electrostrictive layer (7).

With the positioning of the electrostrictive layer (7) beneath the magnetic layer (8), the electric field is most advantageously generated by a potential difference between the write head and the substrate (10). If layers (8) (or (8a) and (8b)) are metallic, they must be electrically floating (non-grounded) in order for the field to be induced (to penetrate) in electrostrictive layer (7). Layer (8) can be a single layer as in FIG. 4a, or it can be an exchange coupled bi-layer, (8a), (8b), as in FIG. 4b, where stress induced anisotropy in (8b) is exchange coupled to the recording layer (8a) to reduce the necessary switching field.

To generate strain in the electrostrictive layer by the electric field, which strain then couples to and stresses the magnetostrictive layer, the most straightforward method is to produce the strain directly from polarizing the electrostrictive layer. However, prior studies also show that strain generation in electrostrictive materials is stronger if the material is in a pre-stressed condition (see Burcsu, cited above). In this pre-stressed condition, the strain appears in a significant degree to stress the magnetostrictive material only when the electric field is applied. Pre-existing stress can be imposed on the electrostrictive layer, which is ferroelectric in nature, during its deposition and growth via crystalline epitaxial growth. Under these conditions, stress on the order of Giga Pascals (GPa) can be impressed into the electrostrictive layer after epitaxial growth is complete. Without an external electric field, the strain of the electrostrictive layer is small even with the large pre-stressed condition and the layer does not deform significantly and does not transmit its stress into the magnetostrictive layer. When the electric field is applied, however, large strain arises in the electrostrictive layer and the layer deforms in accord with the already imposed pre-stressed condition. This, in turn, transfers the pre-stressed condition to the magnetostrictive layer. Therefore, the pre-stressed electrostrictive layer is effectively acting as a stress-switch, in which the applied electric field switches on or off the stress that is already stored in the layer, rather than creating that stress.

As an example, assuming a stress, $\sigma=1$ GPa can be transferred into the magnetic layer after application of an electric field, for a normally high magnetostrictive material like $PtFe_3$ with $\lambda$ approximately $1\times10^{-4}$ (see T. Hikosaka, above) and $M_s$ approximately 1250 emu/cc (see J.-H. Gao, et al., "Magnetization reversal process and magnetic relaxation of self-assemble $Fe_3Pt$ nanowire arrays with different diameters: Experiments and micromagnetic simulations," Phys. Rev. B, vol 75, pp 064421, (2007)), the stress-induced anisotropy field can be as high as: $3\sigma\lambda/M_s=2.4$ kOe. (see "Modern Magnetic Materials, Principles and Applications," Robert C. O'Handley, John Wiley & Sons, Inc., 1999, pp 238.) For extremely high magnetostriction materials, for example $Tb_{0.5}Dy_{0.5}Fe_2$, with $\lambda$ approximately $4\times10^{-4}$ (see Hikosaka, above) and $Tb_{0.5}Dy_{0.7}Fe_2$ with $\lambda>1\times10^{-3}$ (see W. D. Armstrong, "Magnetization and magnetostriction processes in $Tb_{(0.27-0.30)}Dy_{(0.73-0.70)}Fe_{(1.9-2.0)}$," J. Appl. Phys., vol 81, pp 2321 (1997)), together with higher stress at the several GPa level, an induced anisotropy field greater than 1 Tesla is achievable. Thus stress-induced anisotropy is theoretically able to assist writing.

Figures 5, 6:
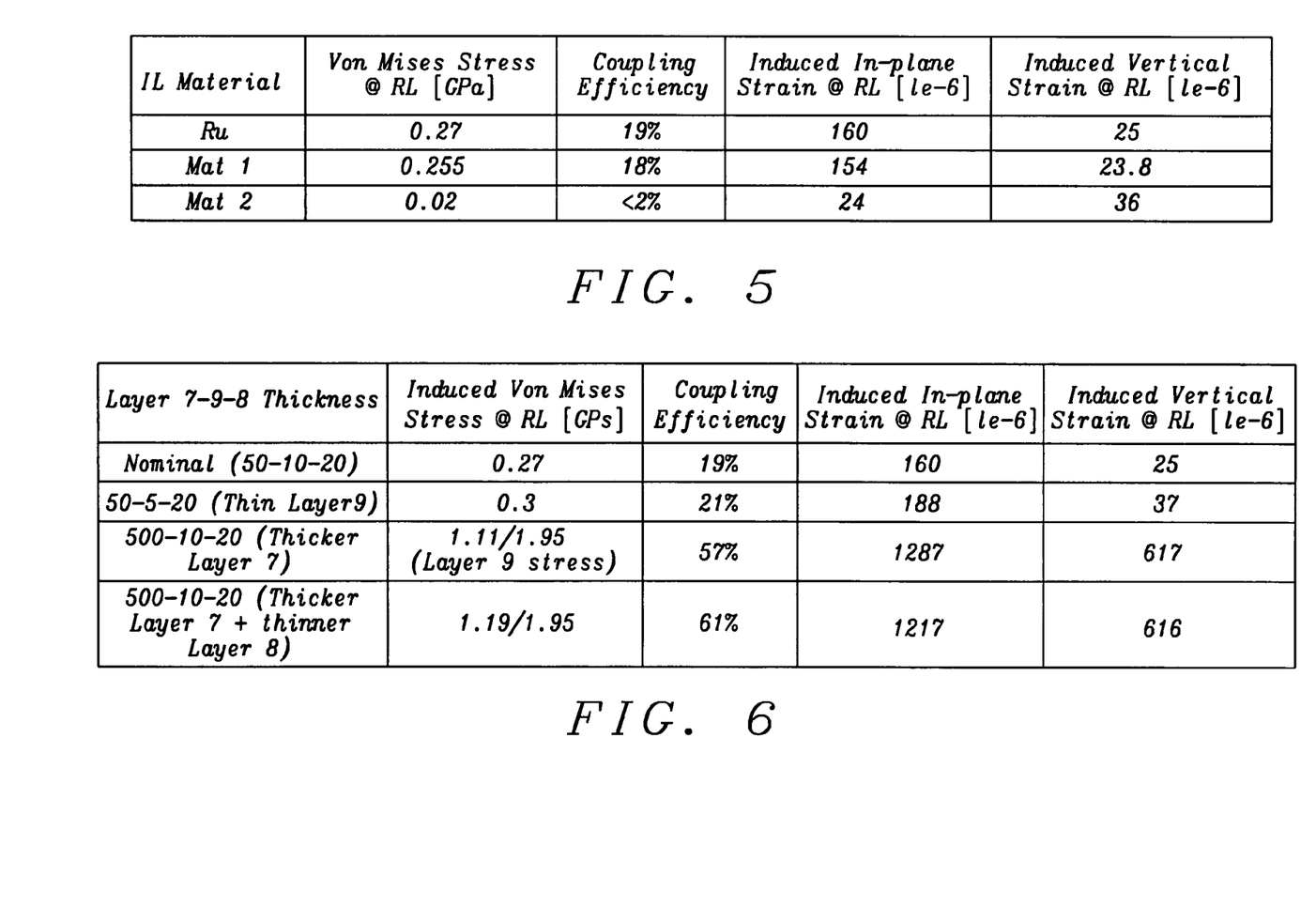
FIG. 5 is a table showing simulated results of the effects of different coupling layers between electrostrictive and magnetostrictive layers.
FIG. 6 is a table showing the effects of layer thickness on the induced anisotropy of the recording layer.

Using the film structure shown in FIG. 4a, finite element modeling (FEM) was performed to verify the effectiveness of inducing stress in the magnetostrictive recording layer (8). The thickness of the three layers schematically illustrated is assumed to be the same thicknesses presently employed in the prior art: top recording layer (8) is approximately 20 nm thick, middle interlayer (9) is approximately 10 nm thick and bottom electrostrictive layer (7) is approximately 50 nm thick. The material properties of the electrostrictive layer are those of the commonly used piezoelectric transducer (PZT). Assuming an electrostrictive layer with Barium Titanate energized with an electric field to be fully saturated, the resulting effective stress level is in the range of 1.4 GPa. The effect of the mechanical property of the interlayer (9) will be examined first. Ru, with a Young's modulus approximately 400 GPa, is the usual choice for its ability to induce a vertical anisotropy in the recording layer (8). Two other materials used in this analysis for comparison have Young's moduli of 117 GPa (Mat. 1, softer than Ru) and 1 GPa (Mat. 2, extremely soft). Referring to FIG. 5, there is shown a table (Table 1) listing the results of the simulation study. In the table, Coupling Efficiency is defined as effective stress in the recording layer (8), divided by the effective stress in the electrostrictive underlayer (7).

The results of this simulation reveals that the harder material (Ru) is superior in transferring stress/strain from the electrostriction layer to the magnetostriction layer. Ru, therefore, with its high Young's modulus is a superior candidate for use in the preferred embodiment illustrated in FIG. 4a. Material 2 shows very poor coupling efficiency since it acts like a sponge to absorb the stress/strain generated in the electrostrictive layer and transfers it poorly to the magnetic layer. It can also be observed that that the induced in-plane strain in the Ru case is much greater than the induced vertical strain (the ratio being 6.4), which can assist the switching of the perpendicular magnetization regions by effectively rendering the magnetic structure of the magnetic layer more isotropic.

The coupling efficiency is fairly low from the simulation results in Table 1 based on the assumed thicknesses of the layers. The next item to be examined in the simulation is the volumetric effect of the three layers for improving the efficiency, while maintaining Ru as the interlayer coupling material and the configuration of FIG. 4a. Referring to FIG. 6, there is shown Table 2, which displays the results of adjusting the thicknesses of the interlayer (9), the electrostriction layer (7) and the recording layer (8).

Making the interlayer thinner, from 10 nm to 5 nm, slightly improves the coupling efficiency from 19% to 21%. Increasing the thickness of the electrostriction layer (7) from 50 nm to 500 nm significantly increases the coupling efficiency from 19% to 57%. Combining this with a thinner magnetic layer (8), from 20 nm to 10 nm, enhances the efficiency to 61%. However, the induced ratio of in-plane to vertical anisotropy decreases from 6.4 to about 2. This means that the strain at layer (8) becomes even more isotropic with a much higher volumetric electrostriction layer. Optimization of the thickness ratio can be achieved by considering the coupling efficiency, ratio of induced in-plane to vertical anisotropy, the switching of magnetization and other recording characteristics.

The Recording Head (Write Head)

Figure 7A:
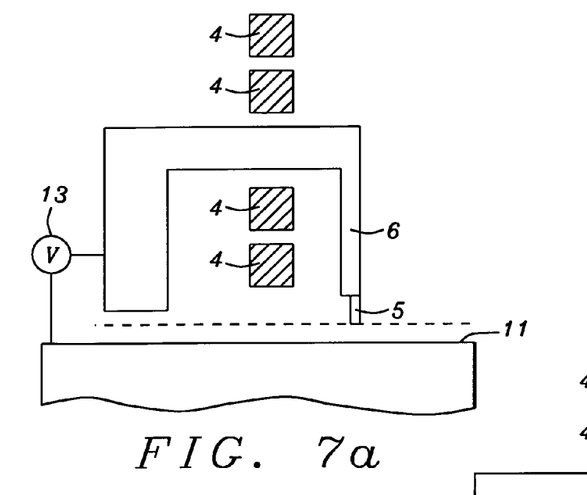
FIG. 7a and FIG. 7b are illustrations of two different configurations of magnetic write heads and electric field generating structures that meet the requirements of the preferred embodiment.
Figure 7B:
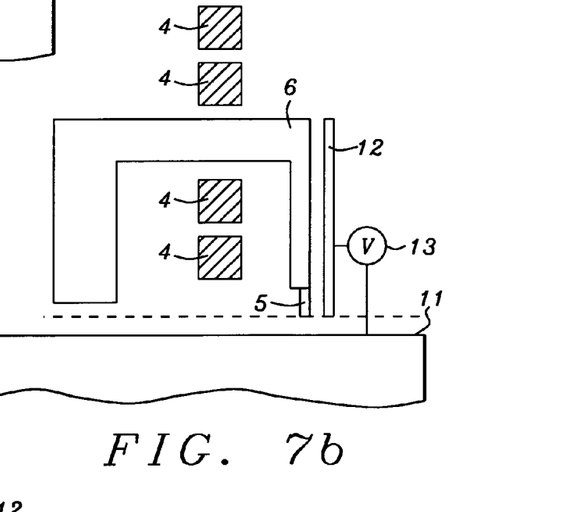

Referring to FIG. 7a and FIG. 7b, there are schematically illustrated a vertical cross-sectional view of two write head structures that would work effectively with the magnetic medium described above. The cross-section in FIG. 7a shows cross-sections of the inductive coil (4) as well as the yoke/pole structure (6) around which the coil is wrapped. A pole tip (5) projects downward from the yoke/pole structure and is maintained at a flying height (dashed line) during rotation of the recording medium (11).

FIG. 7a also shows that, during recording, the yoke/pole structure (6) also acts as the electric field generating structure, indicated by a voltage source V, (13) connected between the yoke/pole and the recording medium (11). The schematic illustration of the medium (11) represents the particular layer or the substrate to which the voltage is applied, depending on the particular layered structure of the medium.

The pole tip (5) not only generates a magnetic field resulting from the energized coil structure (4), but it also generates the electric field as a result of the voltage source, V, (13). Referring to FIG. 7b, there is shown an alternative embodiment of the write head in which a separate structure (12) is the generator of the electric field produced by the voltage source, V, (13). Thus in FIG. 7b, two different structures, (12) and (5) simultaneously provide the electric and magnetic fields respectively.

Figure 8:
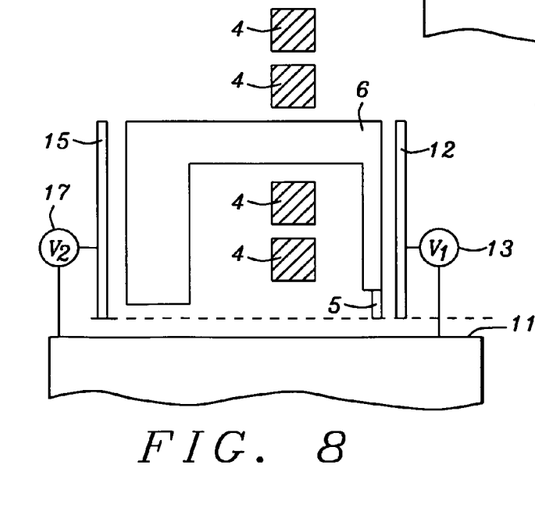
FIG. 8 is an illustration of a write head structure as in FIG. 7b with the addition of a depolarization structure.

Since electrostrictive material is also ferroelectric, it usually has a remanent polarization after the electric field is turned off. With such a remanent polarization, strain also remains. Therefore, if the remanent polarization is not depolaraized, magnetically recorded data will have its effective anisotropy lowered by the stress in the non-recording state of the electrostrictive layer. This leads to easier loss of information due to thermal perturbations of the less anisotropic magnetic storage layer. Thus, in the recording head, apart from the structures shown in FIGS. 7a and 7b, a depolarization structure can also be incorporated which will be beneficial to the overall process of recording and storage. The depolarization process can be implemented by a second electric field generating structure in the recording head. This structure should be positioned away from the magnetic recording structure, so that when the depolarizing electric field is activated, there is no nearby magnetic field to weaken or destroy already recorded data. The second field-producing structure is preferentially located down-track from the pole tip and aligned on the same data track on which the writer is recording, but passes the recorded data later than the pole-tip. While the electric field in the recording part of the write head assists the magnetic field during recording, the electric field from the depolarizing structure in the down-track position applies a much weaker electric field between itself and the medium, in the opposite polarity. Referring to FIG. 8, there is shown a schematic illustration of the write head and medium of FIG. 7b, now also including a second depolarizing electric field generating structure (15) that is activated by a voltage source, $V_2$, (17) that is different than $V_1$, (13) which is that of the writing structure. After application of the depolarizing and stress relieving mechanism, the electrostrictive layer has its stress minimized to cause little corresponding in the magnetic layer and to avoid unwanted anisotropy in a non-recording state. Another option for the depolarizing process is to use the same electric field generating structure as for writing, but to do a second fly-over along the data track just written upon by application of the magnetic field.

As is understood by a person skilled in the art, the preferred embodiments of the present invention are illustrative of the present invention rather than limiting of the present invention. Revisions and modifications may be made to methods, materials, structures and dimensions employed in forming and providing a magnetic recording medium for use in electric field-assisted recording and an electric field-assisted magnetic recording system for recording on said medium, while still forming and providing such a medium and system and its method of formation in accord with the spirit and scope of the present invention as defined by the appended claims.

What is claimed is:

1. A method for recording comprising:

providing a horizontally layered magnetic recording medium including at least one magnetic recording layer having magnetic anisotropy and coercivity for a recording purpose, at least one magnetostrictive layer having magnetostriction properties and at least one electrostrictive layer having electrostriction properties, wherein said layers are elastically coupled so that a strain produced by electrostriction of said at least one electrostrictive layer induces a magnetic response in said at least one magnetostrictive layer and said magnetic response produces a resulting change in the magnetic anisotropy of said at least one magnetic recording layer wherein said magnetic coercivity of said at least one magnetic recording layer is effectively reduced; then placing adjacent to said magnetic recording medium a recording head having both a structure for magnetic field generation and two structures for electric field generation; then using said recording head, generating a first electric field using a first of said two structures for electric field generation and, simultaneously therewith, generating a magnetic field wherein said first electric field and said magnetic field penetrate a first layered region of said magnetic recording medium such that, within said first layered region said first electric field induces electrostrictive strain in said electrostrictive layer and, by means of said elastic coupling, said electrostrictive strain produces a region of corresponding stress in said magnetostrictive layer and a resulting magnetic response, wherein said magnetic response produces a corresponding region of reduced coercivity in said magnetic recording layer, and wherein said simultaneously generated magnetic field writes data on said first region of said magnetic recording medium having an effectively reduced coercivity and;

using a second of said two electric field generating structures, generating a second electric field at a position down-track from said first region at which data is being currently written and not overlapping with said first region, wherein said second electric field is of such a sign and magnitude as to depolarize a second region in said electrostriction layer and eliminate a remanent stress therein at a position at which magnetic data is about to be written.

2. The method of claim 1 wherein one of said at least one magnetostrictive layers is one layer in an exchange coupled bi-layer, wherein said bi-layer also includes a magnetic recording layer that is a data storage layer formed of material having high magnetic anisotropy and wherein said magnetostrictive layer generates a stress-induced anisotropy in said data storage layer.

3. The method of claim 1 wherein there is one electrostrictive layer and there is at least one metallic layer formed above said electrostrictive layer and wherein said at least one metallic layer is electrically floating to allow the generation of an electric field within said electrostrictive layer using either of said two electric field generating structures.

4. The method of claim 1 wherein there is one electrostrictive layer and each of said two electric field generation structures generates an electric field in said one electrostrictive layer when a voltage is applied between said structure and a metallic layer beneath said one electrostrictive layer.

5. The method of claim 1 wherein one of said two electric field generating structures and said magnetic field generating structure are the same structure.

6. The method of claim 1 where said electrostrictive layer is a layer of $BaTiO_3$, $PbTiO_3$, $SrTiO_3$, $LiTaO_3$, $CaMnO_3$ or $PrCaMnO_3$.

7. The method of claim 1 wherein said at least one electrostriction layer is formed in a pre-stressed state.

8. The method of claim 7 wherein said electric field causes stress from said pre-stressed condition to be transferred to an adjacent magnetostriction layer.

9. A device comprising:
a magnetic yoke and pole tip assembly energized by an induction coil;
first and second separated sources of variable electrical potential electrically connected to said pole tip or insulated from said pole tip;
circuitry for energizing said induction coil and said first and second source of variable electrical potential wherein a magnetic field and a first electric field are simultaneously directed at a first adjacent position and wherein a second electric field is directed at a second position that does not overlap with said first adjacent position.

10. The device of claim 9 wherein the simultaneous application of said first electric field and said magnetic fields enables the recording of magnetic data on highly coercive and magnetically anisotropic material.

11. The device of claim 9 wherein said second electric field de-polarizes a polarized portion of an electrostrictive material.

* * * * *